United States Patent
Okude et al.

(10) Patent No.: US 10,656,509 B2
(45) Date of Patent: May 19, 2020

(54) IMAGE PROJECTION APPARATUS

(71) Applicant: SONY CORPORATION, Tokyo (JP)

(72) Inventors: Ken Okude, Kanagawa (JP); Hiroyuki Meguro, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/325,441

(22) PCT Filed: Jun. 14, 2017

(86) PCT No.: PCT/JP2017/021888
§ 371 (c)(1),
(2) Date: Feb. 14, 2019

(87) PCT Pub. No.: WO2018/042816
PCT Pub. Date: Mar. 8, 2018

(65) Prior Publication Data
US 2019/0212638 A1    Jul. 11, 2019

(30) Foreign Application Priority Data
Aug. 31, 2016 (JP) .................... 2016-168765

(51) Int. Cl.
*G03B 21/16* (2006.01)
*H04N 9/31* (2006.01)
(Continued)

(52) U.S. Cl.
CPC ............ *G03B 21/16* (2013.01); *G03B 21/00* (2013.01); *G03B 21/145* (2013.01);
(Continued)

(58) Field of Classification Search
CPC .. G03B 21/16; G03B 21/2033; G03B 21/145; H04N 9/3144
(Continued)

(56) References Cited

U.S. PATENT DOCUMENTS 6,290,360 B1    9/2001  Konuma et al.
6,402,324 B1 *  6/2002  Kuroda ............... G03B 21/006
                                                        353/31
(Continued)

FOREIGN PATENT DOCUMENTS

EP    2 023 202 A2    2/2009
JP    9-133911 A      5/1997
(Continued)

OTHER PUBLICATIONS

International Search Report dated Sep. 5, 2017 in PCT/JP2017/021888 filed on Jun. 14, 2017.
(Continued)

*Primary Examiner* — William C. Dowling
(74) *Attorney, Agent, or Firm* — Oblon, McClelland, Maier & Neustadt, L.L.P.

(57) ABSTRACT

To provide an image projection apparatus that is able to efficiently cool an inside of a housing.
There is provided an image projection apparatus including: an air intake port that is provided in a housing and through which air is caused to flow into an inside of the housing; and an air discharge port that is provided in the housing and through which air inside the housing is discharged. The image projection apparatus includes an air exhaust flow path in which air that has flowed into the inside of the housing from the air intake port is caused to pass through a heat generation component having a highest temperature, at an end of the passing through, among a plurality of heat generation components provided inside the housing, and is discharged from the air discharge port.

10 Claims, 4 Drawing Sheets

(51) Int. Cl.
  *G03B 21/00* (2006.01)
  *H04N 5/74* (2006.01)
  *G03B 21/14* (2006.01)
  *G03B 21/20* (2006.01)

(52) U.S. Cl.
  CPC ........... *G03B 21/2033* (2013.01); *H04N 5/74* (2013.01); *H04N 9/3144* (2013.01)

(58) Field of Classification Search
  USPC ........................................ 353/57, 58, 60, 61
  See application file for complete search history.

(56) References Cited

U.S. PATENT DOCUMENTS

| | | | |
|---|---|---|---|
| 7,237,906 B2 * | 7/2007 | Morimoto ............ | G03B 21/005 353/52 |
| 2001/0008439 A1 | 7/2001 | Konuma et al. | |
| 2003/0206276 A1 | 11/2003 | Konuma et al. | |
| 2005/0083490 A1 | 4/2005 | Konuma et al. | |
| 2007/0115438 A1 | 5/2007 | Tsubura | |
| 2007/0258053 A1 * | 11/2007 | Hsu ........................ | G03B 21/16 353/58 |
| 2009/0141247 A1 * | 6/2009 | Oh ........................ | G03B 21/16 353/61 |
| 2014/0125958 A1 | 5/2014 | Sun et al. | |
| 2014/0354958 A1 | 12/2014 | Tsuchitani et al. | |
| 2016/0050400 A1 * | 2/2016 | Terasaki ............... | H04N 9/3144 353/20 |

FOREIGN PATENT DOCUMENTS

| | | |
|---|---|---|
| JP | 11-153833 A | 6/1999 |
| JP | 2000-330202 A | 11/2000 |
| JP | 2002-373523 A | 12/2002 |
| JP | 2011-150222 A | 8/2011 |
| JP | 2012-8179 A | 1/2012 |
| WO | WO 2014/171150 A1 | 10/2014 |

OTHER PUBLICATIONS

Extended European Search Report dated Aug. 5, 2019 in European Patent Application No. 17845827.9, 7 pages.

* cited by examiner

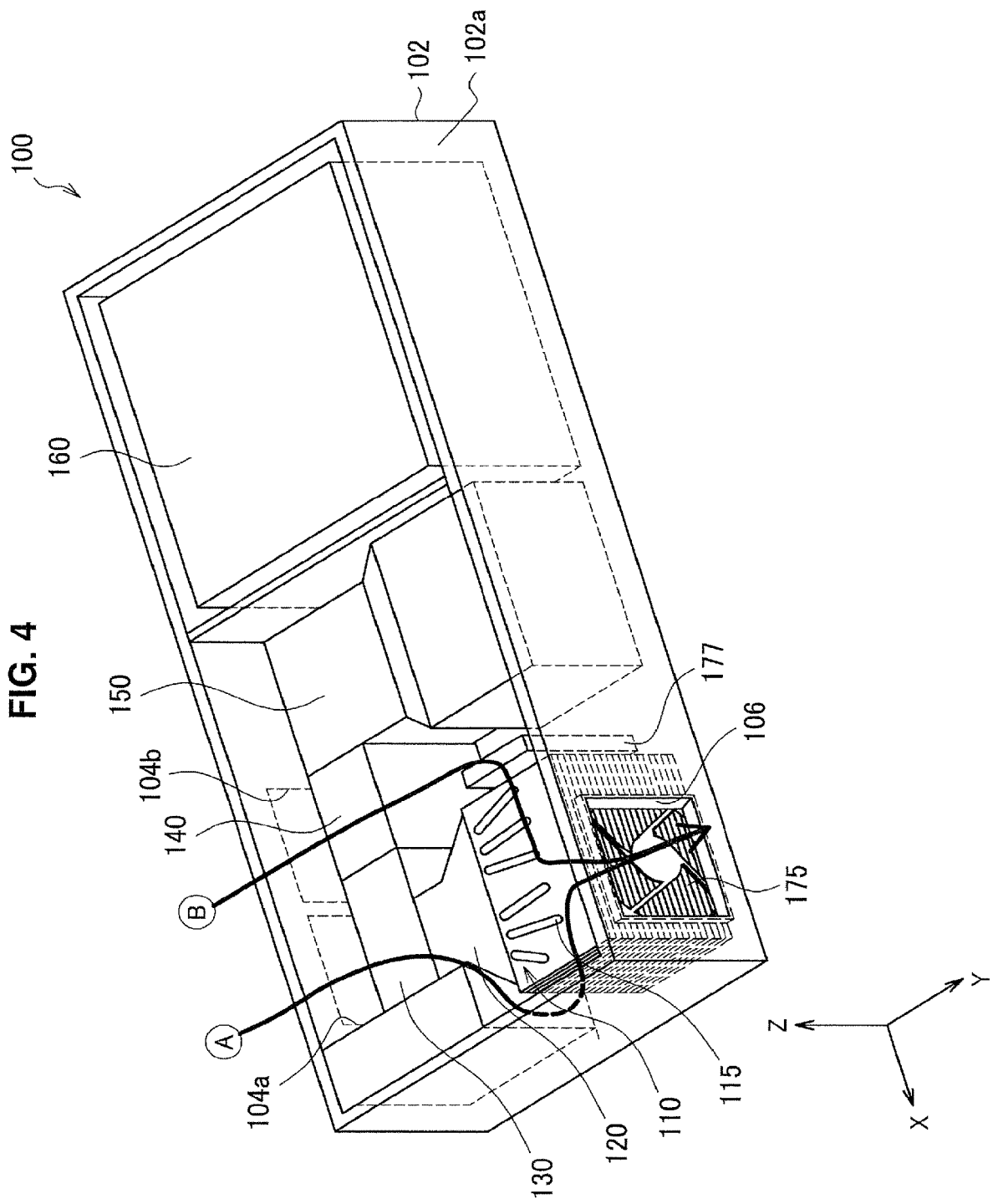

IMAGE PROJECTION APPARATUS

TECHNICAL FIELD

The present disclosure relates to an image projection apparatus that projects an image on a projection face.

BACKGROUND ART

For an image projection apparatus that projects an image on a projection face, a short focus projector has been recently proposed that is able to project an image from a close distance of a projection face. The short focus projector is able to project an image with a shorter distance than a normal projector. Therefore, the short focus projector is able to be provided at a limited space that is close to a projection face, and a shadow of a person is not reflected in a projected image. Such a short focus projector often has a horizontally-long cuboidal profile, and a projecting lens that projects an image on a projection face is often provided at a center portion of a horizontal width.

A temperature of an inside of a housing of an image projection apparatus becomes high due to heat generated from an optical system component such as a light source. High temperature in the inside of the housing leads to performance degradation or shortening of life of components. Therefore, the inside of the housing is cooled with use of a cooling fan, etc. For example, Patent Literature 1 discloses a projecting-type display apparatus in which, in order to efficiently cool each portion inside the apparatus, a flow path is formed so that air that has been taken inside from a cooling air intake port passes through an optical unit, a light source lamp unit, and an electric power supply unit, and is discharged from an outlet.

CITATION LIST

Patent Literature

Patent Literature 1: JP 2000-330202A

DISCLOSURE OF INVENTION

Technical Problem

Here, a short focus projector is provided close to a projection face such as a wall. Therefore, in a case where an outlet for cooling air that has passed through an inside of a housing is provided at a rear face that faces the projection face, warmed air stays between the rear face of a housing and the projection face, and thus, is not efficiently discharged. Further, regarding a side face of the housing as well, a wall, a speaker, or the like may possibly be provided close to the image projection apparatus. Therefore, efficiency in air discharge from the side face may be deteriorated due to the wall or the like. Further, in a case where an air discharge port is provided on a front face side of the housing which faces a user, the air discharge port is likely to enter the user's visual field. In terms of design, it is desirable that the air discharge port is inconspicuous as much as possible.

Therefore, a novel and improved image projection apparatus that is able to efficiently cool an inside of a housing is proposed in the present disclosure.

Solution to Problem

According to the present disclosure, there is provided an image projection apparatus including: an air intake port that is provided in a housing and through which air is caused to flow into an inside of the housing; and an air discharge port that is provided in the housing and through which air inside the housing is discharged. The image projection apparatus includes an air exhaust flow path in which air that has flowed into the inside of the housing from the air intake port is caused to pass through a heat generation component having a highest temperature, at an end of the passing through, among a plurality of heat generation components provided inside the housing, and is discharged from the air discharge port.

Advantageous Effects of Invention

As described above, according to the present disclosure, it is possible to efficiently cool an inside of a housing. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a schematic perspective view of the cooling structure of the image projection apparatus according to the embodiment.

MODE(S) FOR CARRYING OUT THE INVENTION

Figure 1:
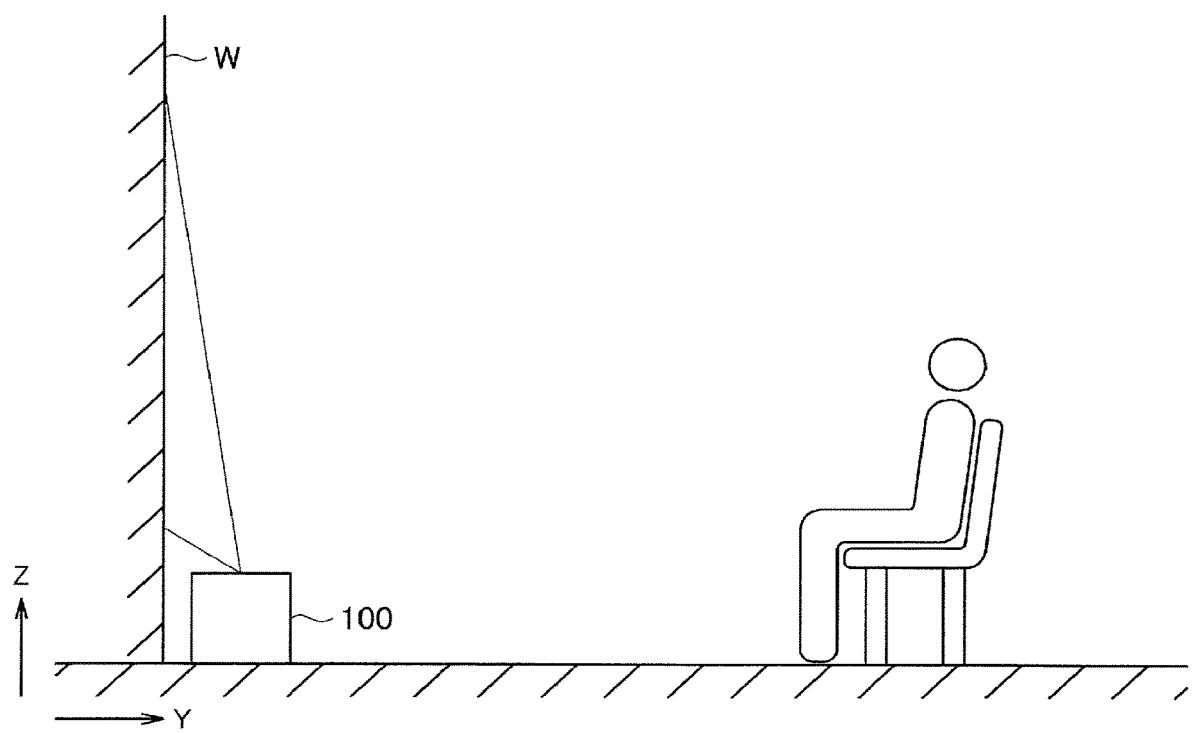
FIG. 1 is a diagram illustrating a use example of an image projection apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the descriptions will be made in the following order.
1. Apparatus Configuration
2. Cooling structure of Optical System Component
   2.1 Air Discharge Flow Path
   2.2 Arrangement of Fan
   2.3 Heat Sink
3. Conclusion

1. APPARATUS CONFIGURATION

Figure 2:
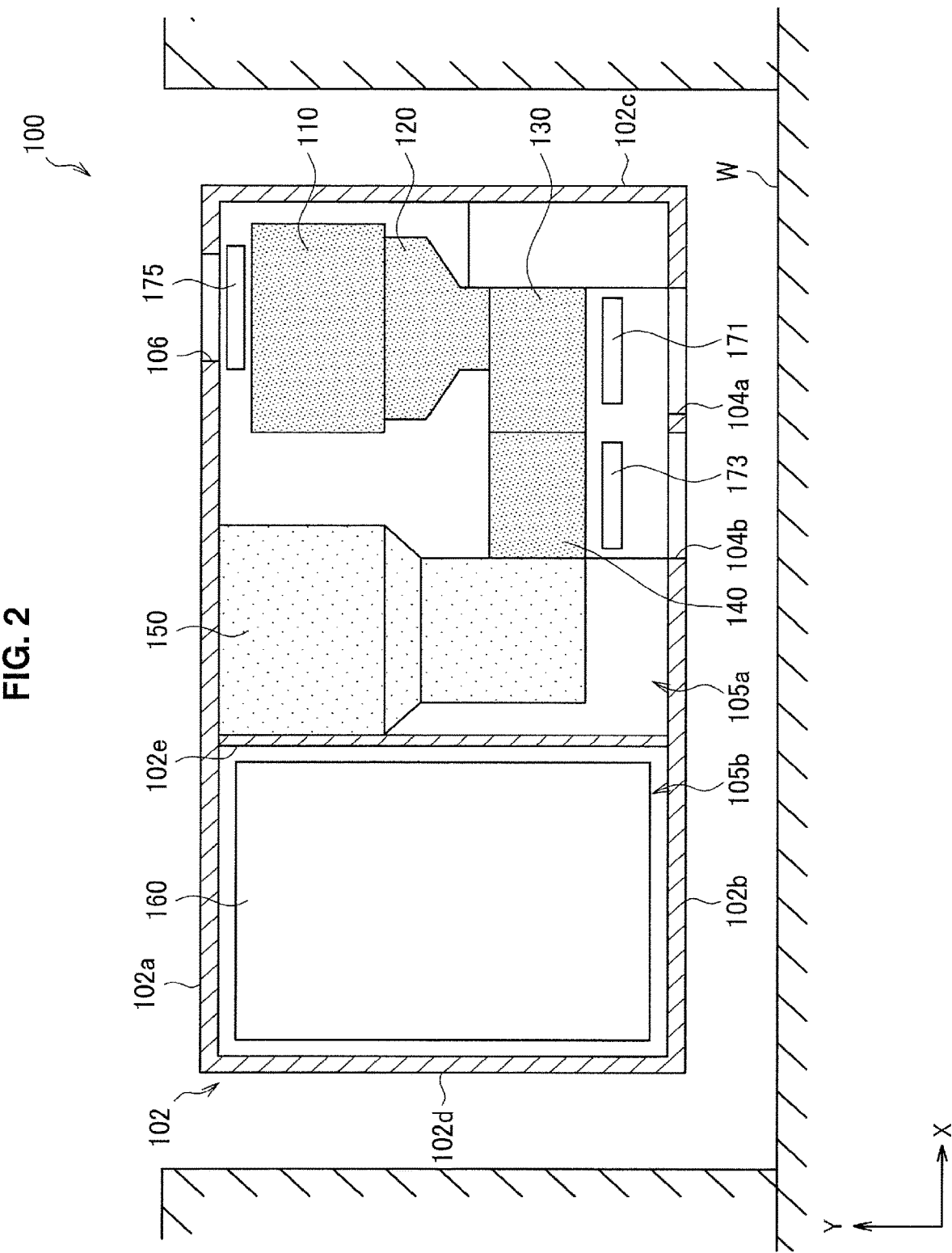
FIG. 2 is a schematic plan view of an inner structure of the image projection apparatus according to the embodiment.

First, a description is given of a configuration of an image projection apparatus according to an embodiment of the present disclosure on the basis of FIGS. 1 and 2. FIG. 1 is a diagram illustrating a use example of an image projection apparatus 100 according to the present embodiment. FIG. 2 is a schematic plan view of an inner structure of the image projection apparatus 100 according to the present embodiment.

The image projection apparatus 100 according to the present embodiment is a short focus projector that is able to project an image to, for example, a projection face from a close distance. As illustrated in FIG. 1, such an image projection apparatus 100 is able to be so provided as to be close to a wall face W that is used as a projection face of the image. Therefore, it is possible to provide the image projection apparatus 100 efficiently in a space. Further, there is no flow line of a person between the image projection apparatus 100 and the wall face W, which prevents a shadow of a person from being reflected in a projected image.

As illustrated in FIGS. 1 and 2, the image projection apparatus 100 according to the present embodiment has a substantially rectangular solid profile. The length in the width direction (X direction) in which a side face 102c faces a side face 102d is greater than the length in the depth direction (Y direction) in which a front face 102a faces a rear face 103b. The image projection apparatus 100 includes a light source unit 110, a fluorescent body wheel unit 120, a polarization conversion element unit 130, a liquid crystal display element unit 140, a projecting unit 150, and an electric power supply unit 160 in such a housing 102. Inside the housing 102, two spaces 105a and 105b are formed by a partition 102e in the width direction. Optical components including the light source unit 110, the fluorescent body wheel unit 120, the polarization conversion element unit 130, the liquid crystal display element unit 140, and the projecting unit 150 are provided in the first space 105a The electric power supply unit 160 is provided in the second space 105b.

Such an image projection apparatus 100 is, for example, a 3LCD (Liquid Crystal Display) projector. In the 3LCD projector, pieces of light each having a corresponding one of three primary colors of red, green, and blue are generated from light emitted from the light source unit 110, and the pieces of light are each transmitted through a corresponding one of three LCDs of the liquid crystal display element unit 140, to thereby generate an image to be projected on the projection face.

The light source unit 110 generates a light source emitting light that is a source of an image. The light source unit 110 according to the present embodiment is a solid light source, and for example, may be a light emitting diode (light emitting diode; LED) or a semiconductor laser (laser diode; LD). For example, a laser light source using the semiconductor laser has a long operating life, low electric power consumption, and high luminance. For example, the light source unit 110 is a blue color laser diode that emits light having a blue light wavelength region. The laser light emitted from the light source unit 110 is outputted to the fluorescent body wheel unit 120.

In the fluorescent body wheel unit 120, a fluorescent body wheel having a fluorescent body laminated on a disc-shaped substrate is provided. The fluorescent body wheel unit 120 converts the laser light emitted from the light source unit 110 into light having another wavelength region. The fluorescent body wheel unit 120 includes a fluorescent body wheel having a fluorescent body laminated on the disc-shaped substrate. The fluorescent body excites the laser light that has entered the fluorescent body and outputs light having another wavelength. For example, the fluorescent body wheel unit 120 includes, as a fluorescent body, a yellow color fluorescent body that outputs light having a yellow color wavelength region which is excited by blue color laser light emitted from a fluorescent body blue color laser diode and includes light having a green color wavelength region and light having a red color wavelength region. The fluorescent body wheel unit 120 generates red color light, green color light, and blue color light on the basis of light entering from the light source unit 110, and outputs these pieces of light to the polarization conversion element unit 130.

The polarization conversion element unit 130 includes a polarization conversion element that causes a polarization direction of each of the red color light, the green color light, and the blue color light that have entered from the fluorescent body wheel unit 120 to be aligned in a corresponding one of predetermined polarization directions. The light that has entered from the fluorescent body wheel unit 120 includes waves having various directions. Here, for example, in a case where a liquid crystal display element has a feature that allows only light having a predetermined polarization direction to be transmitted, as with HTPS (High Temperature Poly-Silicon), if there is light that is unable to be transmitted through the liquid crystal display element, an image becomes darker as the amount of such light becomes greater. Therefore, in the polarization conversion element unit 130, the polarization direction of the light that enters the liquid crystal display element unit 140 is converted from a direction of a horizontal wave to a direction of a vertical wave, to thereby allow light to be able to be transmitted through the liquid crystal display element, making it possible to make an image to be projected from the projecting unit 150 brighter. The light that has been aligned in the predetermined polarization direction by the polarization conversion element unit 130 is outputted to the liquid crystal display element unit 140.

The liquid crystal display element unit 140 includes a liquid crystal panel for red color, a liquid crystal panel for green color, and a liquid crystal panel for blue color, and an optical member that synthesizes signal light beams of an image generated by each liquid crystal panel, and generates image signal light beams to be projected from the projecting unit 150. The red color crystal liquid panel, the green color liquid crystal panel, and the blue color crystal panel may be each an active matrix driving type transmissive LCD such as the HTPS or the like. The liquid crystal panel for each color modulates each of pieces of light that has entered a corresponding one of the panels in accordance with an input image signal, and generates a signal light beam of an image corresponding to each of RGB. The signal light beam modulated by each of the liquid crystal panels is caused to enter a dichroic prism, and synthesized. The dichroic prism is so formed in a rectangular solid that is made by combining four triangle poles as to reflect a red color signal light beam and a blue color signal light beam, to thereby transmit a green color signal light beam. The image signal light beam synthesized by the dichroic prism is caused to enter the projecting unit 150.

The projecting unit 150 projects the image signal light beam that generated by the liquid crystal display element unit 140 on a projection face. The projecting unit 150 according to the present embodiment includes, as a projecting lens, a short focus projection lens having a short projection distance from the image projection apparatus 100 to the projection face. It is possible to perform projection with a large screen size and a short distance by using the short focus projection lens.

The electric power supply unit 160 includes an electric power supply circuit that generates electric power for driving the image projection apparatus 100 from inputted electric power. The electric power is supplied by the electric power supply unit 160 to each component.

As illustrated in FIG. 2, in the image projection apparatus 100 according to the present embodiment, regarding the optical system components provided in the first space 105a, the light source unit 110 and the projecting unit 150 are provided on the front face 102a side that faces a user. Further, the fluorescent body wheel unit 120 and the polarization conversion element unit 130 are provided toward the rear face 102b side from the light source unit 110. Furthermore, the liquid crystal display element unit 140 is provided next to the polarization conversion element unit 130 in the width direction. In other words, regarding the optical system components, the light source unit 110, the fluorescent body wheel unit 120, the polarization conversion element unit 130, the liquid crystal display element unit 140, and the projecting unit 150 are arranged in U-shape.

Further, in order to cool the optical system components, for example, two air intake ports 104a and 104b are provided on the rear face 102b of the housing 102, and an air discharge port 106 is provided on the front face 102a. Further, in the first space 105a, a cooling fan 171 that cools the polarization conversion element unit 130, a cooling fan 173 that cools the liquid crystal display element unit 140, and an air discharge fan 175 for discharging air inside the housing 102 from the air discharge port 106. A detailed description is given later of a cooling structure of the optical system components. It is to be noted that, in the present embodiment, the two air intake ports 104a and 104b, and the air discharge port 106 are provided. However, the present disclosure is not limited to such an example. The number of these ports is not limited thereto. It is possible to further improve cooling efficiency as area of an opening of each of the air intake port and the air discharge port is larger. However, a dust-proof property as well as resistance and strength properties are degraded. Further, a design property is also degraded in a case where a large opening is formed on the front face 102a that is visually recognized easily by a user. Therefore, it is desirable to set area of the opening as small as possible.

2. Cooling Structure of Optical System Component

An image projection apparatus normally includes a cooling structure that takes outside air from an air intake port to thereby cool the inside of a housing and discharge warmed air from an air discharge port, in order to prevent a temperature inside the apparatus from becoming high and exceeding than an allowable value. The air discharge port is typically provided at a rear face side that is not easily recognizable from a user. However, the image projection apparatus 100, which is a short focus projector, of the present embodiment is provided close to the wall face W. Therefore, in a case where the air intake ports 104a and 104b are provided on the rear face 102b, warmed air stays between the rear face 102b and the wall face W, which prevents the warmed air from being discharged efficiently. Further, the wall face W or an object such as furniture or a speaker may be provided also on the side face 102c and 102d sides of the image projection apparatus 100, and even in a case where air discharge ports are provided on the side faces 102c and 102d, discharge of warmed air may possibly be inhibited. Furthermore, as described above, the design property is degraded in a case where the air discharge port is provided on the front face 102a that is easily recognizable by a user.

Figure 3:
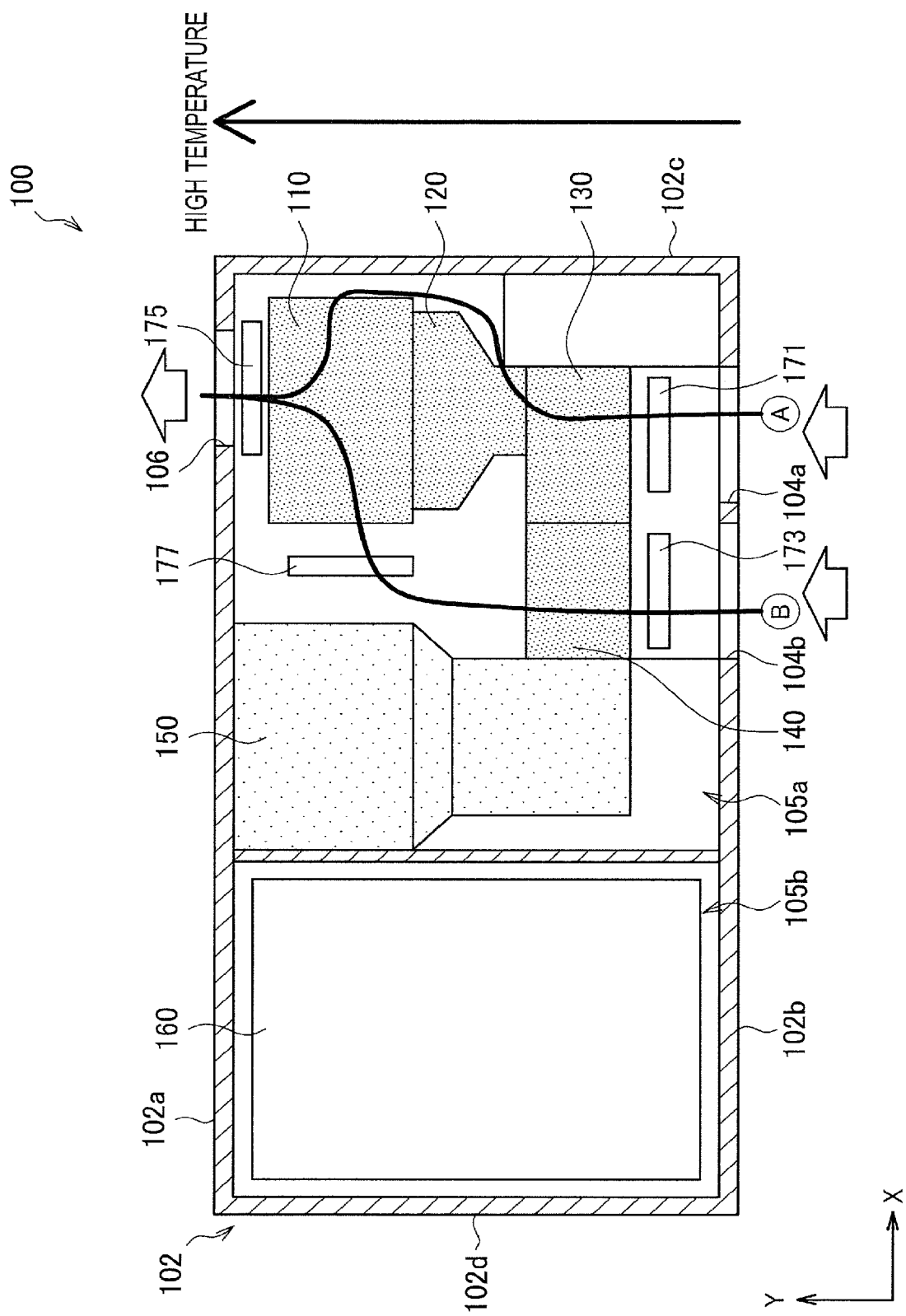
FIG. 3 is a schematic plan view of a cooling structure of the image projection apparatus according to the embodiment.

Therefore, a cooling structure that efficiently cools the inside of a housing without degrading a design property is formed, in the image projection apparatus 100 according to the present embodiment. In particular, the cooling structure is efficient in the first space 105a in which various optical system components, as heat sources in the image projection apparatus 100, are provided. In the following, a description is given of the cooling structure of the image projection apparatus 100 according to the present embodiment on the basis of FIGS. 3 and 4. FIG. 3 is a schematic plan view of the image projection apparatus 100 according to the present embodiment. FIG. 4 is a schematic perspective view of the cooling structure of the image projection apparatus 100 according to the present embodiment. It is to be noted that, in FIGS. 3 and 4, and FIG. 2 as described above, only the cooling structure of the first space 105a is illustrated, and a cooling structure of a second space 105b in which the electric power supply unit 160 is provided is not illustrated. However, an air intake port, an air discharge port, and a cooling fan are provided also in the second space 105b.

[2.1. Air Discharge Flow Path]

As illustrated in FIGS. 3 and 4, cooling of the optical system components of the image projection apparatus 100 according to the present embodiment is performed toward the front face 102a from the rear face 102b of the housing 102. Air taken from the two air intake ports 104a and 104b formed on the rear face 102b passes through the first space 105a to thereby absorb heat of the optical system components, and is discharged from the air discharge port 106 of the front face 102a. Here, as illustrated in FIGS. 3 and 4, the air taken from the air intake ports 104a and 104b in order to cool the first space 105a is discharged from the air discharge port 106 through two air discharge flow paths A and B.

The air discharge flow path A causes the air taken inside the housing 102 from the air intake port 104a to path through the polarization conversion element unit 130 and the fluorescent body wheel unit 120, and to be discharged from the air discharge port 106 through the light source unit 110. Further, the air discharge flow path B causes the air taken inside the housing 102 from the air intake port 104b to pass through the liquid crystal display element unit 140, and to be discharged from the air discharge port 106 through the light source unit 110. In any of the air discharge flow paths, the warmed air is discharged from the air discharge port 106 through the light source unit 110 at the end. This is due to the fact that the amount of heat generation from the light source unit 110 is the greatest among the heat generation components that generate heat out of the optical system components of the image projection apparatus 100. Further, the image projection apparatus 100 according to the present embodiment includes a laser light source in the light source unit 110. The laser light source is likely to have high temperature locally, as compared to a lamp light source such as a conventional halogen lamp, a xenon lamp, a metal halide lamp, or an extra-high pressure mercury lamp. Therefore, providing the light source unit 110 at the end of each of the air discharge flow paths makes it possible to improve the cooling efficiency of the light source unit 110.

Cooling of the optical system components is performed by taking outside air from the air intake ports 104a and 104b as a cooling medium and causing heat possessed by each component to be absorbed while causing the air to pass through the first space 105a. Here, assuming that the air intake ports 104a and 104b side is an upstream side and the air discharge port 106 side is a downstream side in the air discharge flow path, temperature of the air taken inside the housing from the air intake ports 104a and 104b increases as the air goes from the upstream toward the downstream of the air discharge path. Therefore, temperature of air that cools the components differs depending on the locations of the optical system components provided in the first space 105a. Further, the amount of heat generation differs for each of the optical system components. Therefore, forming the air discharge flow path in which the air taken inside the housing 102 from the air intake port 104a and 104b flows from components each having a low temperature to components each having a high temperature makes it possible to efficiently cool each of the optical system components.

In the image projection apparatus 100 according to the present embodiment, the light source unit 110, the fluorescent body wheel unit 120, the polarization conversion element unit 130, and the liquid crystal display element unit 140 are main heat generation components. Of these components, the light source unit 110 has the highest temperature. Further, the amount of heat generation from the liquid crystal display element unit 140 is small, and the amount of heat generation is larger in the following order of the fluorescent body wheel unit 120, the polarization conversion element unit 130. Here, as illustrated in FIG. 3, the polarization conversion element unit 130 and the liquid crystal display element unit 140 each having a small amount of heat generation are provided on the rear face 102b side. The light source unit 110 having a large amount of heat generation is provided on the front face 102a side. Therefore, providing the air intake ports 104a and 104b on the rear face 102b of the housing 102 and providing the air discharge port 106 at a location facing the light source unit 110 which has the highest temperature among the components at the front face 102a allow the air discharge flow paths A and B in which the air flows from the components each having a low temperature to the components each having a high temperature to be formed. It is to be noted that the temperatures of the heat generation components may be each specified on the basis of, for example, a temperature during a rated operation.

In the present embodiment, the air intake ports 104a and 104b are respectively provided for the polarization conversion element unit 130 and the liquid crystal display element unit 140 each having a small amount of heat generation, to thereby make it possible to initially cool the polarization conversion element unit 130 and the liquid crystal display element unit 140. Further, in the air discharge flow path A, the air that has cooled the polarization conversion element unit 130 cools the fluorescent body wheel unit 120 having a higher temperature than the temperature of the polarization conversion element unit 130, and cools the light source unit 110 at the end. In contrast, in the air discharge flow path B, the air that has cooled the liquid crystal display element unit 140 passes through the space between the light source unit 110 and the projecting unit 150 and cools the light source unit 110 at the end. In this way, it is possible to cool each component with air having a lower temperature than temperatures of the components as cooling targets.

This holds true for the perspective of a temperature specification of each of the optical system component. For example, an allowable temperature for the light source unit 110 is about 70° C. However, an allowable temperature for the liquid crystal display element unit 140 is about 50° C. Therefore, there is a possibility that the temperature of air when the air hits each component becomes considerably high for the liquid crystal display element unit 140, even in a case where the temperature does not cause any problem for the light source unit 110. Therefore, it is desirable to cool the components in the order from a component having a lower allowable temperature, in order to maintain the function of each of the optical system components and to make these components available until the end of their expected operating lives.

Further, as illustrated in FIG. 3, the two air discharge flow paths A and B are so arranged as to be in substantially parallel with the side faces 102c and 102d that are short sides of the housing 102, i.e., along the depth direction (Y direction). Forming such air discharge flow paths A and B shortens the distance of the air as a cooling medium passing through the inside of the first space 105a, to thereby make it possible to prevent the air that has been warmed during flowing the inside of the first space 105a from staying longer in the first space 105a. This makes it possible to cause the inner space of the housing 102 to be less likely to be warmed.

Further, regarding the arrangement of the air intake ports 104a and 104b and the air discharge port 106, in view of the configuration of the air discharge flow paths, the air intake ports 104a and 104b are provided at the rear face 102b, and the air discharge port 106 is provided at the front face 102a. This arrangement is also effective from the perspective of design property. In other words, preventing any air discharge port from being provided at the rear face 102b or the side faces 102c and 102d makes it possible to discharge the warmed air from the front face 102a even in a case where the rear face 102b or the side faces 102c and 102d of the image projection apparatus 100 are brought to be close to the wall face W. At this occasion, arranging discharging destinations of the air discharge flow paths A and B into one location of the air discharge port 106 of the front face 102a makes it possible to make opening area of the front face 102a small, leading to a favorable appearance.

[Arrangement of Fan]

The image projection apparatus 100 according to the present embodiment is provided with a cooling fan for cooling the optical system components. Specifically, a cooling fan 171 for cooling the polarization conversion element unit 130 and a cooling fan 173 for cooling the liquid crystal display element unit 140 are provided. It is to be noted that, in FIGS. 2 and 3, only one cooling fan 173 is illustrated. However, a cooling fan may be provided for each of three liquid crystal panels that are provided for the liquid crystal display element unit 140. Further, the air discharge fan 175 for discharging air inside the housing from the air discharge port 106 is provided.

For example, a sirocco fan may be used for the cooling fans 171 and 173 that cool the polarization conversion element unit 130 and the liquid crystal display element unit 140. The sirocco fan is able to perform strong ventilation with high pressure for each component. Therefore, the sirocco fan is suitable for local cooling. In contrast, for example, an axial fan may be used for the air discharge fan 175. The axial fan performs weak ventilation but is able to send much air. Therefore, the axial fan is suitable for discharging.

In a case where air inside the first space 105a is discharged outside by the air discharge fan 175, the same amount of air as the discharged air is taken from the air intake ports 104a and 104b on the rear face 102b side. The air taken from the air intake ports 104a and 104b is sucked by the air discharge fan 175, passes through the first space 105a along the air discharge flow paths A and B, and is discharged from the air discharge port 106. Further, in the air discharge flow path B, the air that has cooled the liquid crystal display element unit 140 passes through a space formed between the light source unit 110 and the projecting unit 150, and moves toward the light source unit 110. At this occasion, for example, as illustrated in FIGS. 3 and 4, an auxiliary fan 177 may be provided in a space formed between the light source unit 110 and the projecting unit 150, so that the air that has passed through the liquid crystal display element unit 140 is reliably guided to the light source unit 110. For example, the axial fan may be used for the auxiliary fan 177. This makes it possible to reliably guide the air that has passed through the liquid crystal display element unit 140 to the light source unit 110, allowing for the formation of the distinct air discharge flow path B.

[2.3. Heat Sink]

In order to efficiently perform heat discharge of the optical system components, a heat sink may be provided as necessary for the first space. For example, as illustrated in FIG. 4, a heat sink 115 may be provided for the light source unit 110 in which the temperature becomes high. The heat sink 115 may be provided on, for example, an upper face, a front face, and a side face of the light source unit 110. In the cooling structure of the image projection apparatus 100 according to the present embodiment, the air as a cooling medium flows, at the end, into the light source unit 110 that has the highest temperature among the optical system components, passes through the heat sink 115, and is discharged outside the housing 102 from the air discharge port 106. Providing the heat sink 115 for such a light source unit 110 makes it possible to efficiently cool the light source unit 110.

3. CONCLUSION

The image projection apparatus 100 and the cooling structure formed in the image projection apparatus 100 according to an embodiment of the present disclosure are described as above. According to the present disclosure, the air intake ports 104a and 104b, and the air discharge port 106 are provided for the housing 102 of the image projection apparatus 100, and the air that has flowed into the inside of the housing 102 from the air intake ports 104a and 104b is caused to pass through the light source unit 110 having the highest temperature, at the end of the passing through of the air, among the heat generation components of the optical system components, to thereby cause the resultant air to be discharged from the air discharge port 106. Configuring such an air discharge flow path makes it possible to efficiently cool the optical system components.

Further, providing the air intake ports 104a and 104b on the rear face 102b of the housing 102 and providing the air discharge port 106 on the front face 102a do not prevent the air inside the housing 102 from being discharged. Further, providing only one air discharge port 106 of the front face 102a prevents a user from seeing a large opening and thus does not degrade the design property. Further, forming an air discharge flow path that is substantially parallel to the side faces 102c and 102d each as a short side of the housing 102 makes it possible to prevent the air as a cooling medium from staying long inside the space in which the optical system components are provided. This makes it possible to cause the inner space of the housing 102 to be less likely to be warmed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment described above, the light source of the light source unit is a light emitting diode or a semiconductor laser. However, the present technology is not limited to these examples. For example, the present technology is effective even in a case where a conventionally used lamp light source is used as a lamp light source.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image projection apparatus including:

an air intake port that is provided in a housing and through which air is caused to flow into an inside of the housing; and an air discharge port that is provided in the housing and through which air inside the housing is discharged, in which the image projection apparatus includes an air exhaust flow path in which air that has flowed into the inside of the housing from the air intake port is caused to pass through a heat generation component having a highest temperature, at an end of the passing through, among a plurality of heat generation components provided inside the housing, and is discharged from the air discharge port.

(2)

The image projection apparatus according to (1), in which the air intake port is provided on a rear face of the housing, the rear face facing a projection face of an image.

(3)

The image projection apparatus according to (1) or (2), in which the housing has a shape in which a length in a width direction in which side faces face each other is greater than a length in a depth direction in which a front face faces the rear face, and the air intake port and the air discharge port are arranged on a same straight line that is substantially in parallel with the depth direction of the housing.

(4)

The image projection apparatus according to (3), in which the air intake port is provided on the rear face of the housing, and the air discharge port is provided on the front face of the housing.

(5)

The image projection apparatus according to any one of (1) to (4), in which the air discharge port is provided as a single piece.

(6)

The image projection apparatus according to any one of (1) to (5), in which an air discharge fan is provided at the air discharge port, the air discharge fan causing air inside the housing to be discharged.

(7)

The image projection apparatus according to any one of (1) to (6), in which the heat generation component having the highest temperature is a light source unit including a light emitting diode or a semiconductor laser.

(8)

The image projection apparatus according to any one of (1) to (7), in which an auxiliary fan is provided inside the housing, the auxiliary fan guiding air to the heat generation component having the highest temperature.

(9)

The image projection apparatus according to any one of (1) to (8), in which a heat sink is provided for the heat generation component having the highest temperature, and air is discharged from the air discharge port through the heat sink.

(10)

The image projection apparatus according to any one of (1) to (9), in which a light source unit and a projecting unit that projects an image on a projection face are provided on a front face side, and a polarization conversion element unit and a liquid crystal display element unit are provided on a rear face side inside the housing.

(11)

The image projection apparatus according to any one of (1) to (10), in which the image projection apparatus is a short focus projector including a short focus lens in a projecting unit that projects an image on a projection face.

REFERENCE SIGNS LIST 100 image projection apparatus
102 housing
102a front face
102b rear face
102c, 102d side face
102e partition
103 housing
103b rear face
104a, 104b air intake port
105a first space
105b second space
106 air discharge port
110 light source unit
115 heat sink
120 fluorescent body wheel unit
130 polarization conversion element unit
140 liquid crystal display element unit
150 projecting unit
160 electric power supply unit
171, 173 cooling fan
175 air discharge fan
177 auxiliary fan

The invention claimed is:

1. An image projection apparatus comprising:
an air intake port that is provided in a rear face of a housing and through which air is caused to flow into an inside of the housing;
an air discharge port that is provided in a front face of the housing and through which air inside the housing is discharged; and
a projecting unit including a lens and configured to project an image at a surface that is closer to the rear face of the housing than the front face of the housing, the projecting unit being closer to the front face of the housing than the rear face of the housing,
wherein the image projection apparatus includes an air exhaust flow path in which air that has flowed into the inside of the housing from the air intake port is caused to pass through a heat generation component having a highest temperature, at an end of the passing through, among a plurality of heat generation components provided inside the housing, and is discharged from the air discharge port.

2. The image projection apparatus according to claim 1, wherein the surface faces the rear face of the housing.

3. The image projection apparatus according to claim 1, wherein
the housing has a shape in which a length in a width direction in which side faces face each other is greater than a length in a depth direction in which the front face faces the rear face, and
the air intake port and the air discharge port are arranged on a same straight line that is substantially in parallel with the depth direction of the housing.

4. The image projection apparatus according to claim 1, wherein the air discharge port is provided as a single piece.

5. The image projection apparatus according to claim 1, wherein an air discharge fan is provided at the air discharge port, the air discharge fan causing air inside the housing to be discharged.

6. The image projection apparatus according to claim 1, wherein the heat generation component having the highest temperature is a light source unit including a light emitting diode or a semiconductor laser.

7. The image projection apparatus according to claim 1, wherein an auxiliary fan is provided inside the housing, the auxiliary fan guiding air to the heat generation component having the highest temperature.

8. The image projection apparatus according to claim 1, wherein
a heat sink is provided for the heat generation component having the highest temperature, and
air is discharged from the air discharge port through the heat sink.

9. The image projection apparatus according to claim 1, wherein a light source unit and the projecting unit that projects the image on surface are provided on a side of the front face, and a polarization conversion element unit and a liquid crystal display element unit are provided on a side of the rear face inside the housing.

10. The image projection apparatus according to claim 1, wherein the image projection apparatus is a short focus projector including a short focus lens in the projecting unit that projects an image on a projection face.

* * * * *